(12) United States Patent
Shannon, III

(10) Patent No.: US 9,436,239 B1
(45) Date of Patent: Sep. 6, 2016

(54) COOLING DEVICE FOR ELECTRONIC DEVICE

(71) Applicant: BobjGear, LLC, Clermont, FL (US)

(72) Inventor: Robert James Shannon, III, Clermont, FL (US)

(*) Notice: Subject to any disclaimer, the term of this patent is extended or adjusted under 35 U.S.C. 154(b) by 0 days.

(21) Appl. No.: 14/833,399

(22) Filed: Aug. 24, 2015

(51) Int. Cl.
    *F28F 7/00*     (2006.01)
    *G06F 1/20*     (2006.01)
    *G06F 1/16*     (2006.01)

(52) U.S. Cl.
    CPC ............... *G06F 1/203* (2013.01); *G06F 1/206* (2013.01); *G06F 1/1628* (2013.01); *G06F 1/20* (2013.01); *G06F 2200/201* (2013.01)

(58) Field of Classification Search
    CPC ........ G06F 1/203; G06F 1/20; G06F 1/1628; G06F 2200/201; G06F 1/206; F28D 2021/0028; H01L 23/40; H01L 23/467
    See application file for complete search history.

(56) References Cited

U.S. PATENT DOCUMENTS

| | | | | |
|---|---|---|---|---|
| 8,624,111 B2* | 1/2014 | Tages | ................. | B29C 45/1676 174/50 |
| 9,075,570 B2* | 7/2015 | Yuan | ..................... | G06F 1/1628 |
| 9,274,554 B2* | 3/2016 | Wong | ..................... | G06F 1/1628 |
| 2013/0188890 A1* | 7/2013 | Naor | ..................... | B65D 83/08 383/71 |
| 2013/0295836 A1* | 11/2013 | Shannon, III | ........ | H05K 5/0213 454/284 |
| 2014/0000844 A1* | 1/2014 | Chandaria | ............ | H05K 7/2039 165/80.2 |
| 2014/0092561 A1* | 4/2014 | Chen | ........................ | G06F 1/181 361/720 |
| 2016/0099741 A1* | 4/2016 | Rayner | ................. | G06F 1/1656 455/575.8 |

* cited by examiner

*Primary Examiner* — Marc Norman
*Assistant Examiner* — Jon T Schermerhorn

(57) ABSTRACT

A cooling device for coupling to an electronic device that provides for cooling of the electronic device. The cooling device includes an inner side with a plurality of projections for coupling to a corresponding side or portion of the electronic device. The cooling device includes side walls extending about at least a portion of the back portion and from the inner side. The side walls include an inner surface for coupling to sides or portions of the electronic device. The side walls include a plurality of cooling apertures therethrough, and cooling channels recessed in the second inner surface extending from each cooling aperture to at least the back portion. When the cooling device is coupled with the electronic device, the plurality of projections, cooling channels, and portions of the electronic device proximate thereto form a plurality of cooling pathways that extend between the plurality of cooling apertures.

14 Claims, 8 Drawing Sheets

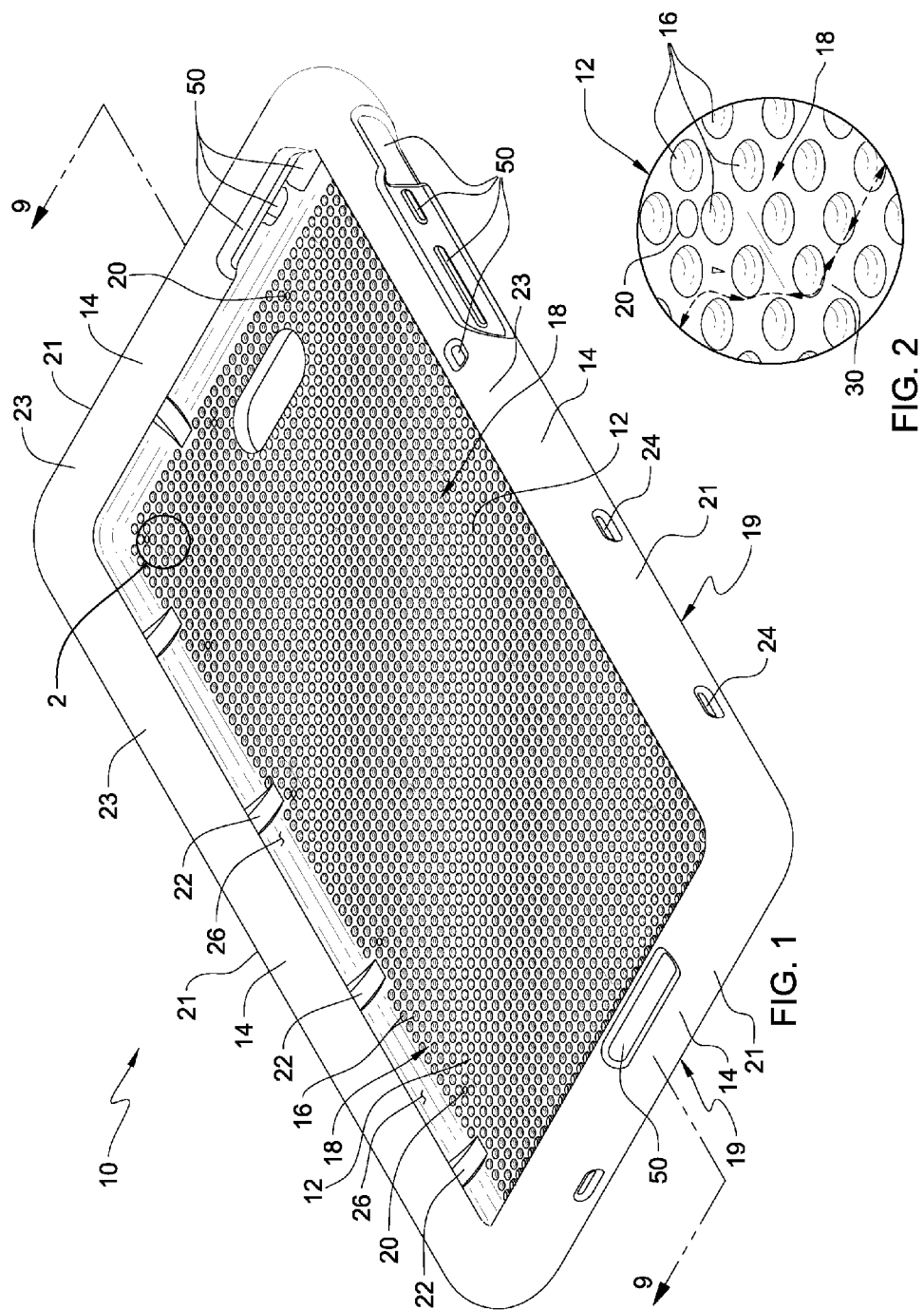

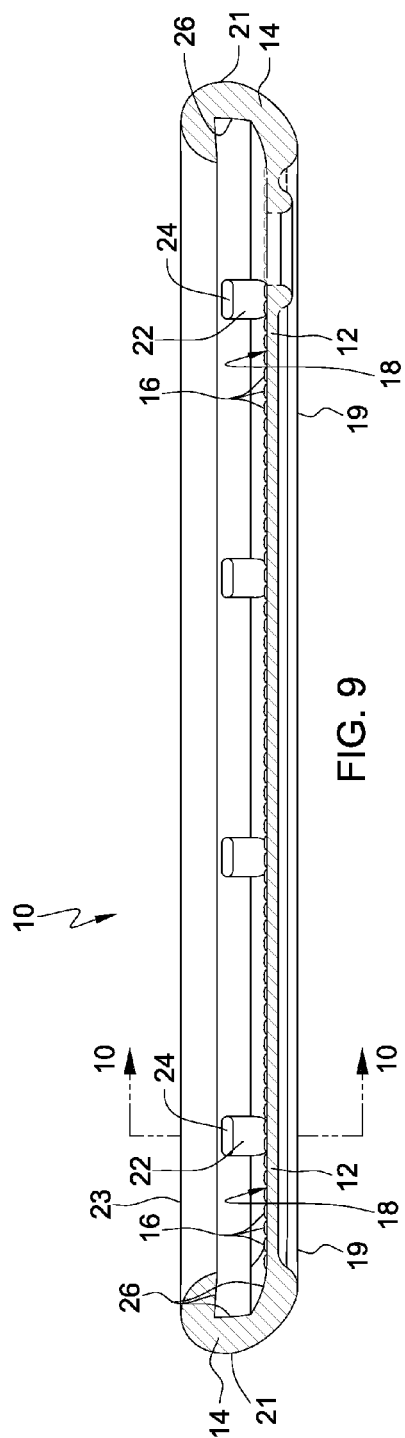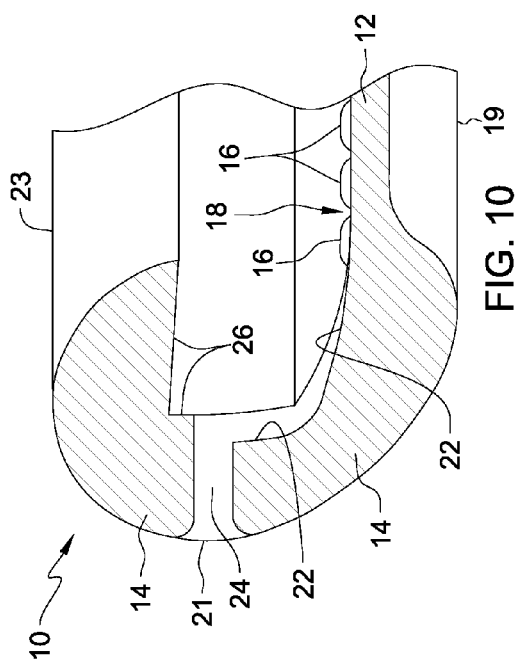

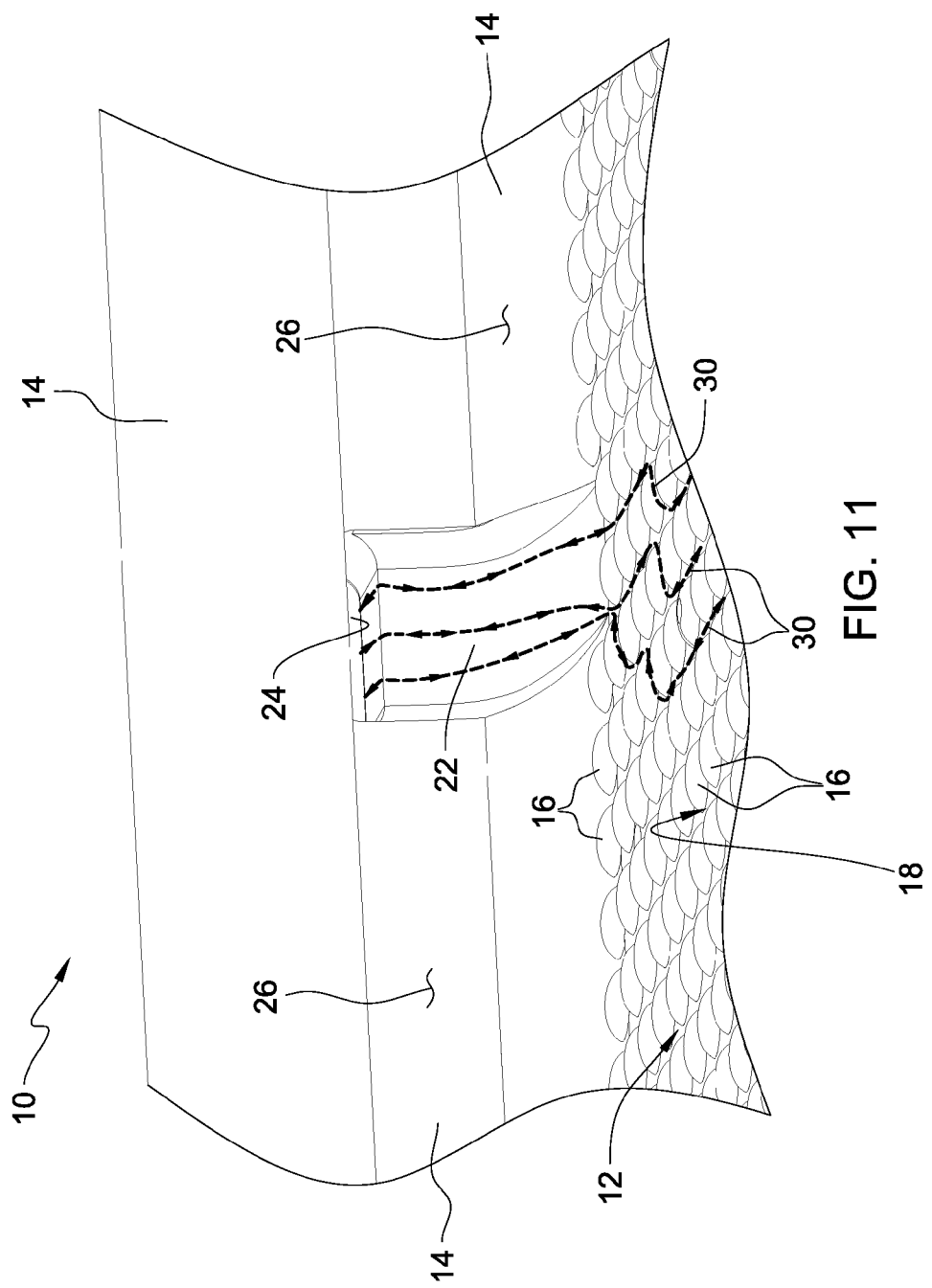

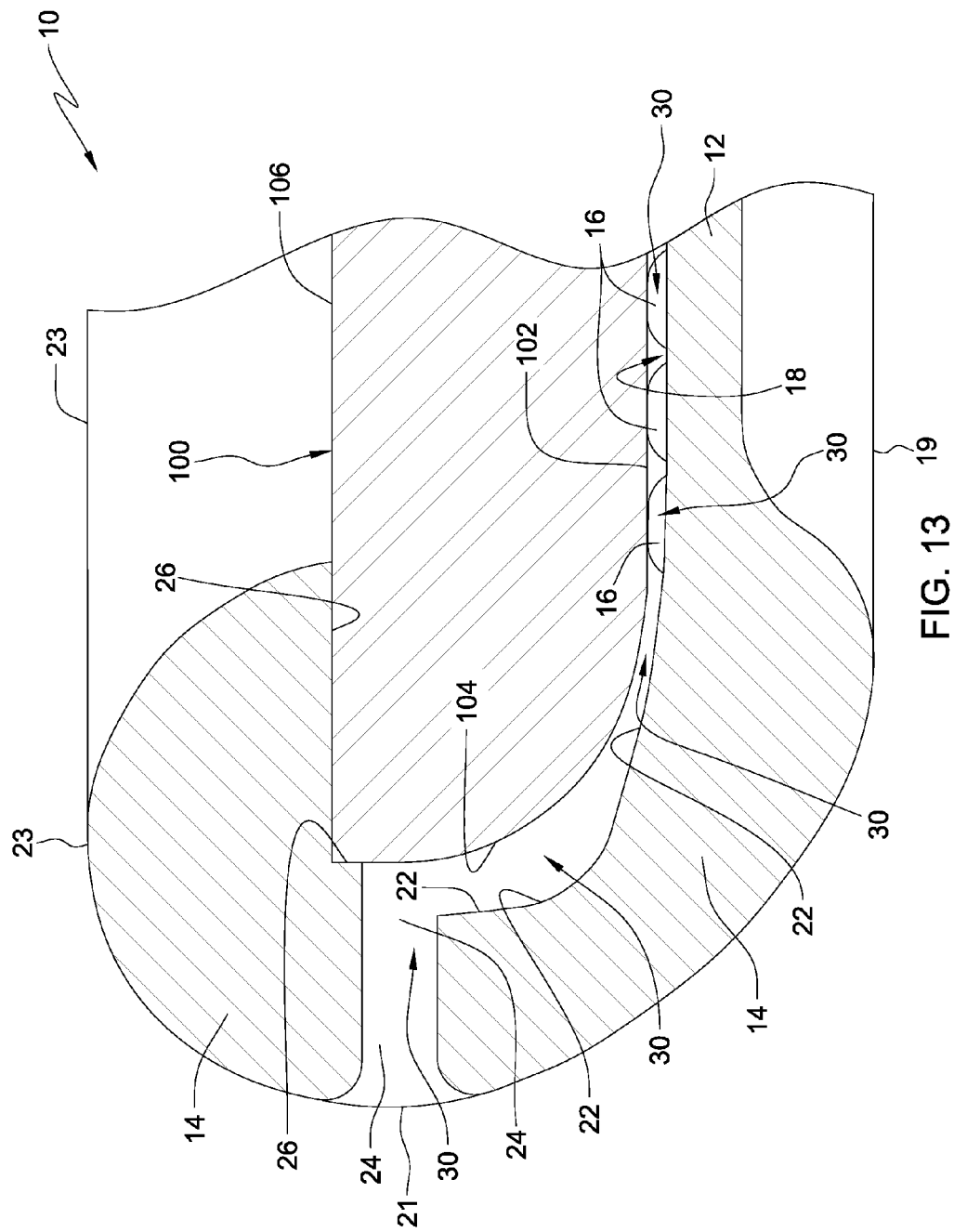

COOLING DEVICE FOR ELECTRONIC DEVICE

CROSS-REFERENCE TO RELATED APPLICATION

This application is related to commonly assigned, co-filed U.S. Design patent application Ser. No. 29/537,171, by petitioner and entitled "Cooling Device for Electronic Device," which is hereby incorporated herein by reference in its entirety.

BACKGROUND

The present application relates generally to cooling devices and related methods configured to cool an electronic device, and more particularly to cooling devices and related methods that provide for passive cooling when the cooling device and the electronic device are coupled.

Many electronic devices or systems generate heat that may affect the performance and/or comfort or ease of use of the devices. For example, many modern day personal electronic devices or systems, such as computers, tablet computers, phones, music players, electronic readers and other transportable or personal electronic devices generate a relatively large amount of heat during use. The heat produced by electronic devices may negatively affect the performance, such as the computing speed and/or life of the components of the devices, and/or the comfort or feel of the electronic devices to a user.

A variety of cooling mechanisms may be used to cool electronic devices. Many primarily mechanically-based mechanisms, such as air flow cooling systems (e.g., electric fans) and heat sinks, are commonly utilized to cool electronic devices. However, these mechanisms are often relatively large or heavy, especially in comparison to modern day electronic devices, unsightly, negatively affect the use of the electronic devices (e.g., portability, ergonomics, etc.), relatively expensive and/or are unreliable or relatively easily damaged. Other non-primarily mechanically-based cooling mechanisms, such as electrostatic air movement, corona discharge effect cooling, liquid cooling, phase-change cooling, etc. are typically expensive, not compatible with many personal electronic devices, and/or relatively large or heavy.

Further, typical electronic device cooling mechanisms, both primarily mechanically-based mechanisms and non-primarily mechanically-based mechanisms, are fixed, integrated or incorporated into electronic devices during the manufacture or assembly of the devices. Stated differently, typical electronic device cooling mechanisms are designed to be incorporated or installed during the manufacture or assembly of the devices and cannot be incorporated, installed or otherwise utilized with pre-existing electronic devices.

Accordingly, it is an object of the present invention to overcome one or more of the above-described drawbacks and/or disadvantages of the prior art.

SUMMARY OF THE INVENTION

In one aspect, the present disclosure provides for a cooling device for an electronic device. The cooling device includes a back portion and side walls. The back portion includes a first outer surface and a first inner surface. The first inner surface includes a plurality of projections for coupling to a back side of the electronic device when the cooling device is coupled to the electronic device. The side walls extend about at least a portion of the periphery of the back portion and from the first inner surface thereof including a second outer surface and a second inner surface for coupling to side surfaces of the electronic device when the cooling device is coupled to the electronic device. The side walls include a plurality of cooling apertures extending from the second inner surface to the second outer surface and a recessed cooling channel in the second inner surface extending from each cooling aperture at least to the back portion. When the cooling device is coupled to the electronic device, the plurality of projections, the cooling channels and the back side of the electronic device form a plurality of cooling pathways extending between the plurality of cooling apertures and along at least a portion of the back side of the electronic device.

In some embodiments, a front side of the electronic device may include a display configured to be viewed in a first orientation of the electronic device, and a plurality of cooling apertures may include a first cooling aperture positioned above a second cooling aperture in the vertical direction when the cooling device is coupled to the electronic device and the electronic device is oriented in the first orientation. In some such embodiments, the display may be configured to be viewed in a second orientation of the electronic device, and the plurality of cooling apertures may include a first cooling aperture positioned above a second cooling aperture in the vertical direction when the cooling device is coupled to the electronic device and the electronic device is oriented in either of the first and the second orientations.

In some embodiments, the majority of the first inner surface may include the plurality of projections. In some embodiments, at least 75 percent of the first inner surface may include the plurality of projections. In some embodiments, the first inner surface may include within the range of about 40 projections per square inch to about 120 projections per square inch. In some embodiments, each cooling channel may extend on the first inner surface of the back portion proximate to the plurality of projections on the first inner surface. In some embodiments, the plurality of projections may be spaced from each other on the first inner surface, and at least some of the portions of the first inner surface void of the plurality of projections may be substantially planar.

In some embodiments, the plurality of projections may be dome or conical shaped. In some such embodiments, the projections may each be defined by a radius of about 1.3 millimeters. In some embodiments, the plurality of projections may be arranged in an evenly spaced grid pattern. In some embodiments, the back portion and the side walls may be of one-piece construction. In some embodiments, the back portion and the side walls may be formed of food-grade silicone. In some embodiments, the electronic device may be a portable hand-held electronic device.

In one aspect, the present disclosure provides for a method of making an electronic device cooling device. The method includes forming a back portion including a first outer surface and a first inner surface with a plurality of projections. The method further includes forming side walls extending about at least a portion of the periphery of the back portion and from the first inner surface thereof including a second outer surface, a second inner surface, a plurality of cooling apertures extending from the second inner surface to the second outer surface, and a recessed cooling channel in the second inner surface extending from each cooling aperture at least to the back portion.

In some embodiments, forming a back portion and forming side walls may comprises substantially simultaneously injection molding the back portion and the side walls in a mold defining the back portion and the side walls. In some embodiments, the back portion and the side walls may be formed from food grade silicone. In some embodiments, at least 75 percent of the first inner surface may include about 40 projections per square inch to about 120 projections per square inch. In some embodiments, each cooling channel may extend on the back portion proximate to the plurality of projections on the first inner surface. In some embodiments, the plurality of projections may be substantially dome or conical shaped and spaced from each other on the first inner surface.

These and other objects, features and advantages of this disclosure will become apparent from the following detailed description of the various aspects of the disclosure taken in conjunction with the accompanying drawings.

BRIEF DESCRIPTION OF THE DRAWINGS

FIG. 1 is a front perspective view of an exemplary electronic cooling device according to the present disclosure;

FIG. 2 is an enlarged front perspective view of a portion of the electronic cooling device of FIG. 1;

FIG. 9 is a cross-sectional view of the electronic cooling device of FIG. 1 as indicated in FIG. 1;

FIG. 10 is an enlarged cross-sectional view of a portion of the electronic cooling device of FIG. 1 as indicated in FIG. 9;

FIG. 11 is an enlarged front perspective view of a portion of the electronic cooling device of FIG. 1;

FIG. 13 is an enlarged cross-sectional view of a portion of the electronic cooling device and the electronic device of FIG. 12 as indicated in FIG. 12.

DETAILED DESCRIPTION

Figure 3:
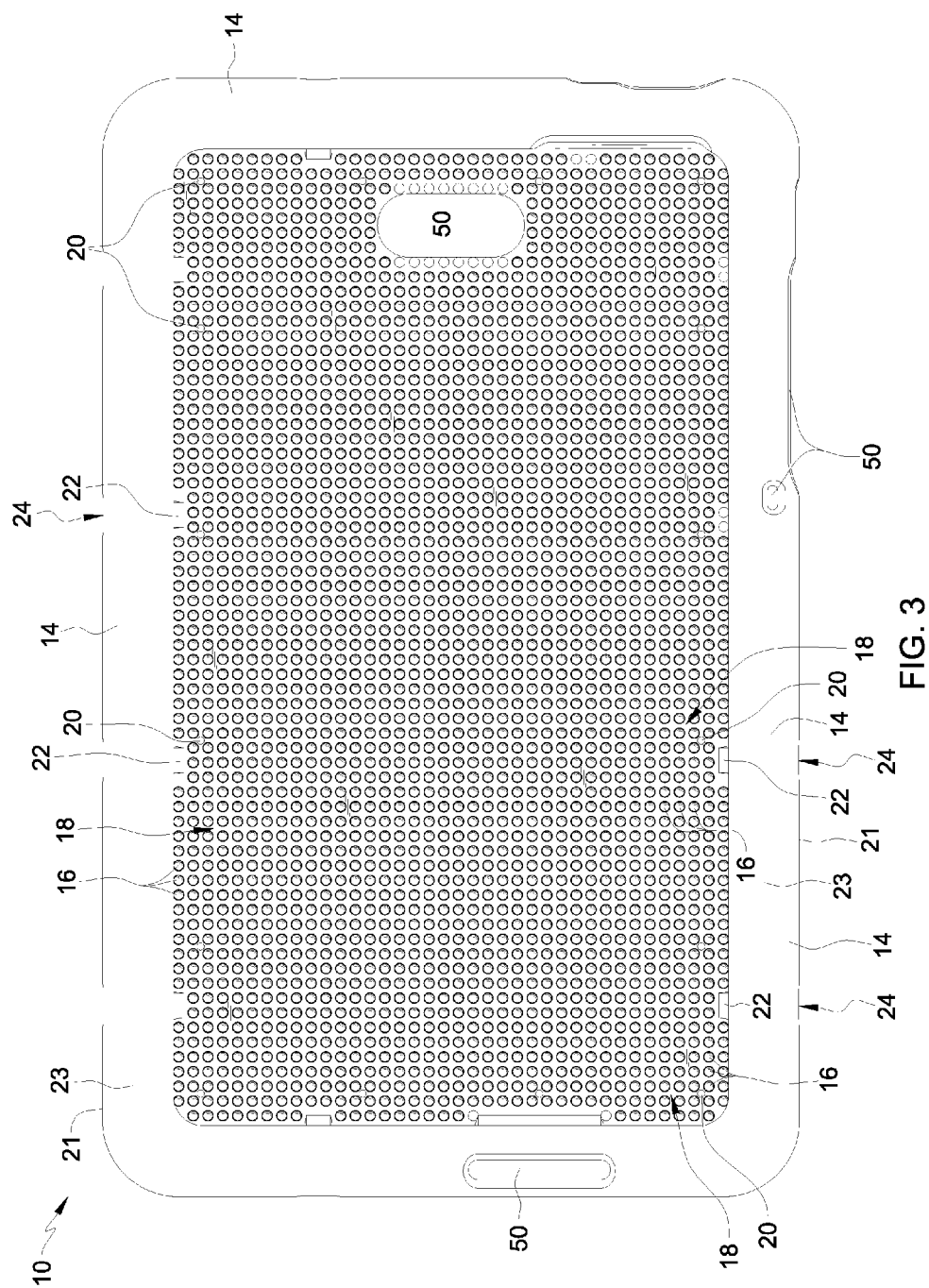
FIG. 3 is a front view of the electronic cooling device of FIG. 1.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular seal embodiment may similarly be applied to any other seal embodiment disclosed herein.

The electronic cooling devices according to the present disclosure provide for cooling of electronic devices that are coupled with the electronic cooling devices. For example, the electronic cooling devices according to the present disclosure provide for passive air cooling or passive heat exchange of electronic devices that are coupled with the electronic cooling devices. As explained in further detail below, the electronic cooling devices according to the present disclosure provide for air cooling of electronic devices through a thermosiphon or stack ventilation effect. In this way, the electronic cooling devices according to the present disclosure are "passive" such that no external energy is input or utilized to produce a flow of air that cools a respective electronic device via convection.

As shown in FIGS. 1-13, an exemplary electronic cooling device according to the present disclosure is generally referenced by reference numeral 10. While electronic cooling device 10 is sized, shaped and otherwise configured to couple to a tablet computer, electronic reader, smart phone or other relatively thin rectangular or square shaped electronic device 100, it is recognized that any other size, shape or other configuration to suit a particular electronic device 100 may equally be employed without departing from the spirit and scope of the disclosure. For example, as explained further below, the back portion 12 and the side walls 14 of the exemplary electronic cooling device 10 illustrated in FIGS. 1-13 may be alternatively sized, shaped or otherwise modified such that when the cooling device 10 is coupled to a particular electronic device 100 that generates heat, the projections 16 of the back portion 12 and the channels 22 of the side walls 14 form, in concert with a portion of the particular electronic device 100, cooling passageways 30 that extend between cooling apertures 24 of cooling channels 22 formed through the side walls 14 to form a thermosiphon or stack ventilation effect and, thereby, cool the electronic device 100 via convection (i.e., via a heat exchange based on passive convection).

Still further, features or aspects of the illustrated exemplary electronic cooling device 10 that do not contribute to cooling, as explained further below, may be eliminated or modified, and/or additional features may be added. For example, as shown in FIGS. 1-13, the device 10 may include speaker apertures, port/jack/plug apertures, electrical switch or button apertures or recesses, camera apertures, or other features 50 that are configured to accommodate or cooperate with corresponding aspects of a particular electronic device 100 (when the cooling device 10 and the particular electronic device 100 are coupled). While such features 50 of the cooling device 10 allow or provide for access or functioning of cooperating aspects of a particular electronic device 100 that is coupled to the device 10, the features 50 may not allow or provide for access or functioning of aspects of a different electronic device 100 (as such aspects vary from electronic device 100 to electronic device 100). As such, the features 50 of the cooling device 10 that do not contribute to cooling, but may allow or provide for access or functioning of cooperating aspects of a particular electronic device 100, may be modified, removed, added or otherwise configured to suit or match a particular electronic device 100 without departing from the spirit and scope of the present disclosure.

As shown in FIGS. 1-13, the electronic cooling device 10 may include a back portion 12 and side walls 14. In the illustrated embodiment, the back portion 12 and the side walls 14 are of one piece construction (i.e., integral). In some such embodiments the back portion 12 and side walls 14 may be co-molded or otherwise integral. The back portion 12 and side walls 14 may be made from a material that is compatible with electronics devices, such as a material that does not interfere with the function or use of the electronic device 100 and/or protects or otherwise safeguards the electronic device 100 when the electronic device 100 and the cooling device 10 are coupled. In some embodiments, the back portion 12 and side walls 14 may be formed of food grade silicone.

The back portion 12 and side walls 14 may be sized and shaped to couple with a particular electronic device 100. For example, the back portion 12 may include an inner side or surface 18 that includes a plurality of projections 16, as described further below. At least the inner side 18 of the back portion 12 may be sized, shaped and otherwise configured to abut, hold, mimic, accommodate or otherwise couple with at least a portion of a side or surface 102 of a particular electronic device 100. For example, the back portion 12 of the cooling device 10 may be sized, shaped and otherwise configured to abut against a back side or surface 102 of an electronic device 100. Similarly, as another example, the side walls 14 may include an inner side or surface 26 that includes a plurality of channels 22, as described further below. At least the inner surfaces 26 of the side walls 14 may be sized, shaped and otherwise configured to abut, hold, mimic, accommodate or otherwise couple with at least a portion of a side or edge 104 of a particular electronic device 100. For example, the side walls 14 of the cooling device 10 may be sized, shaped and otherwise configured to abut against sides or edges 104 of an electronic device 100. In this way, in some embodiments, the back portion 12 and side walls 14 of the cooling device 10 may be sized, shaped and otherwise configured such that when a particular electronic device 100 is positioned on the inner side 18 of the back portion 12 and within the side walls 14, the cooling device 10 and electronic device 100 are removably coupled or secured, with the cooling device 10 at least partially surrounding the electronic device 100 and the cooling device 10 protecting or shielding the electronic device 100.

In some embodiments, an outer surface 21 of the side walls 14 may form or define the outer side edges or portions of the cooling device 10. For example, the outer surface 21 of the side walls 14 may form or define the top edge or portions 32 of the cooling device 10 (and the side walls 14 themselves), the bottom or back edge or portions 19 of the cooling device 10 and the side walls 14 themselves), and/or the lateral sides or portions of the cooling device 10 (and the side walls 14 themselves). In some embodiments, the back portion 18 may be positioned between the top edges or portions 32 and the bottom or back edges or portions 19 of the cooling device 10 (and within an inner surface 26 of the side walls 14, as described further below).

Figure 4:
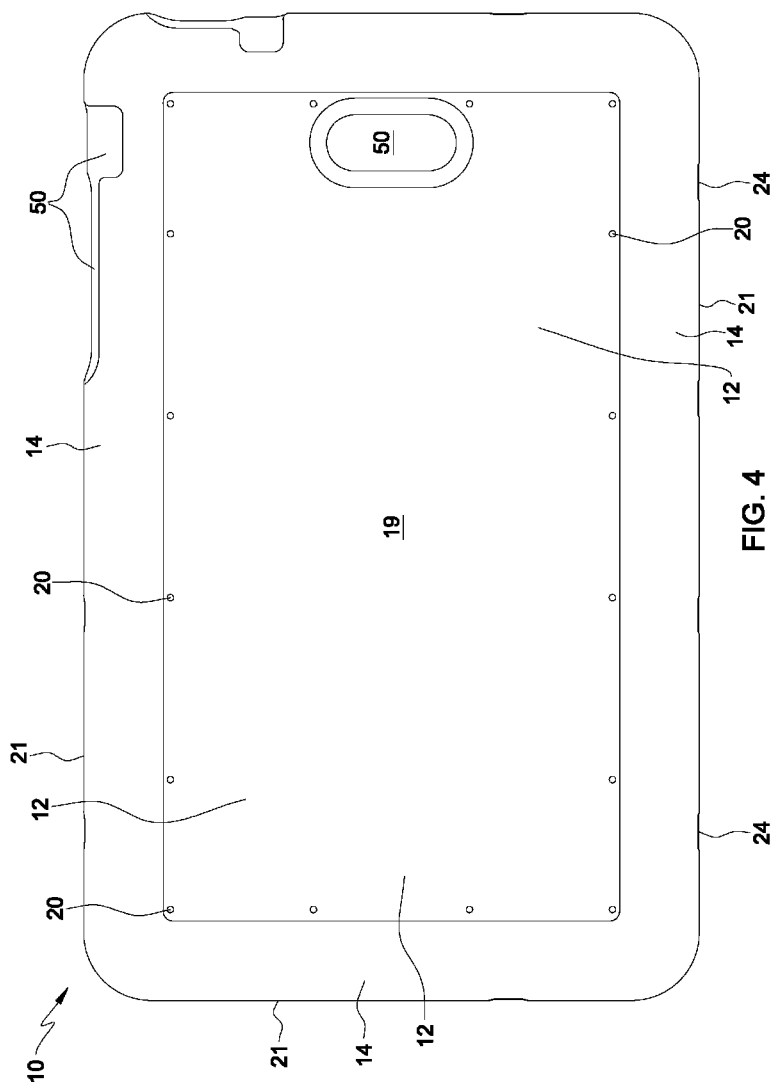
FIG. 4 is a back view of the electronic cooling device of FIG. 1.
Figure 5:
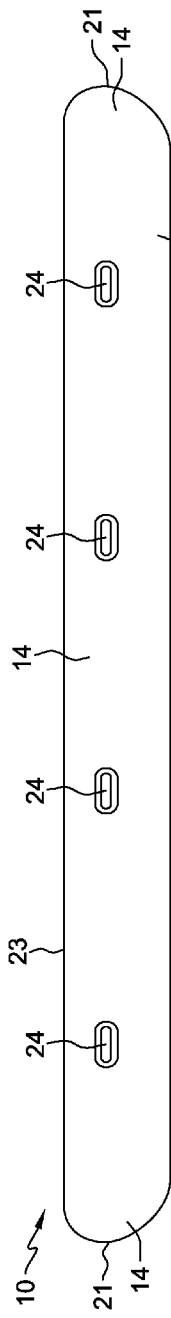
FIG. 5 is a left side view of the electronic cooling device of FIG. 1.
Figure 6:
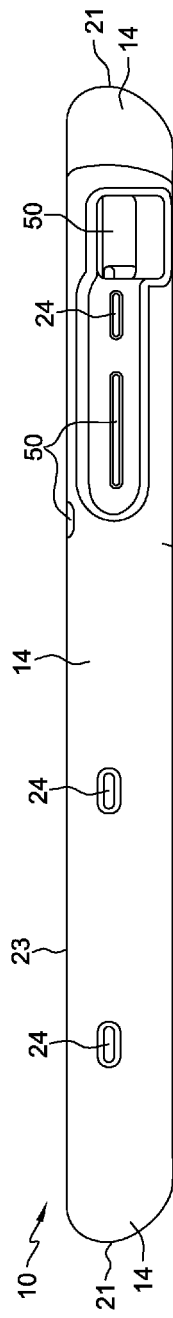
FIG. 6 is a right side view of the electronic cooling device of FIG. 1.
Figure 7:
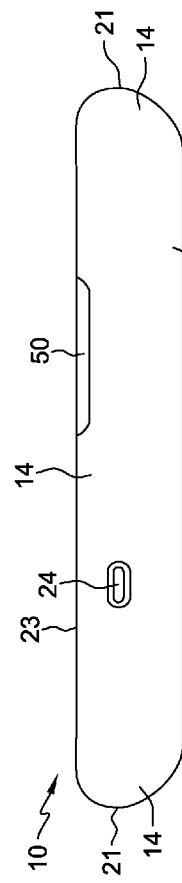
FIG. 7 is a bottom view of the electronic cooling device of FIG. 1.
Figure 8:
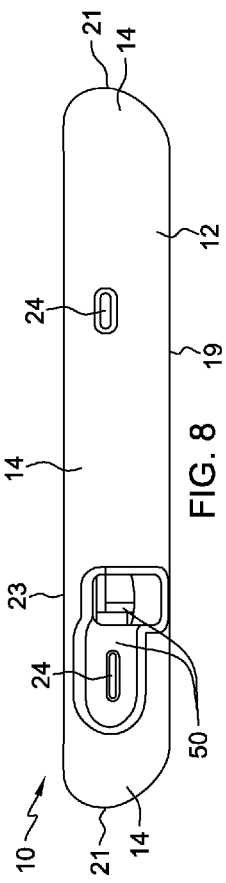
FIG. 8 is a top view of the electronic cooling device of FIG. 1.

As shown in FIGS. 1-13, in the illustrated exemplary embodiment the inner side or surface 18 of the back portion 12 is substantially planar and rectangular in shape to substantially correspond to a back surface or portion 102 of a particular electronic device 100. The interior of the inner side or surface 18 of the back portion 12 may include at least one aperture 20 that extends through the back portion 12, as shown in FIGS. 1-4. For example, the exemplary embodiment includes an aperture 20 extending through the back portion 12 proximate to the periphery of the back portion 12 (and/or proximate to the side walls 14), as shown in FIGS. 3 and 4. Alternative back portion 12 embodiments may include fewer or additional apertures 20 extending therethrough, or may include apertures 20 in differing positions or orientations. In some alternative embodiments, the back portion 12 may be void of any apertures 20 extending therethrough (i.e., from the inner side or surface 18 to an outer side or surface thereof 19). For example, the back portion 12 may be substantially solid and otherwise configured to be substantially airtight or prevent air or moisture from passing through the back portion 12.

The interior 18 of the back portion 12 may also include a plurality of projections 16, as shown in FIGS. 1-3 and 9-13. The projections 16 may extend from the inner side 18 to form a raised surface or plane spanning the "top" or apex of the plurality of projections 16 configured to engage or abut a side or surface 102 of an electronic device 100, such as abut against a back side 102 of an electronic device 100. In this way, the projections 16 may be configured to abut or support and conduct heat from an electronic device 100 coupled with the cooling device 10. In some embodiments, the apex or inner-most portion of the projections 16 may form a plane or surface that extends or is oriented substantially parallel to the inner side 18 of the back portion 12. The projections 16 may be provided on a substantial portion of the back portion 12, such as a majority of the inner surface 18 of the back portion 12. For example, at least about 75 percent of the inner surface 18 may includes the plurality of projections 16. In other embodiments, at least about 95 percent of the inner surface 18 may includes the plurality of projections 16. In some embodiments, the entirety of the inner surface 18 may include the plurality of projections 16.

The projections 16 may be included at least adjacent or proximate to the side walls 14 of the cooling device 10, such as adjacent or proximate to the cooling channels 22 provided in the inner surfaces 26 of the side walls 14. For example, the projections 16 may extend or be provided at least adjacent or proximate to at least a pair of cooling channels 22 provided in the side walls 14 to form a plurality of cooling pathways 30 extending between the cooling apertures 24 associated with the pair of cooling channels 22. In some embodiments, the projections 16 may be provided at least in an area that corresponds to an area of a side or portion 102 of a particular electronic device 100 that becomes relatively hot during operation of the electronic device 100, and on portions of the inner side or portion 18 that extends to the cooling channels 22 of the side walls 14, to ensure effective and/or efficient cooling of the particular electronic device 100 when the particular electronic device 100 and the cooling device 10 are coupled.

As shown in FIGS. 1-3 and 9-13, the projections 16 may be separate and distinct projections 16 that are spaced from each other. In such embodiments, the inner side or surface 18 of the back portion 12 may include portions or areas that extend between the projections 16. In some such embodiments, the portions of the inner side or surface 18 that extends between the plurality of projections 16 (i.e., the portions of the inner side or surface 18 that are void of the projection 18) may be substantially planar. In some other embodiments, the portions of the inner side or surface 18 that extends between the plurality of projections 16 (i.e., the portions of the inner side or surface 18 that are void of the projection 18) may be substantially non-planar. The at least one aperture 20 extending through the back portion 18 (if provided) may be positioned or arranged between the projections 16 or are void of the projections 16 (i.e., a portion of the back portion 18 void of the projections 16). In alternative embodiments (not shown), however, the projections 16 may extend from each other or may abut each other such that the back portion 12 does not include areas that extend between the projections 16 (i.e., the inner side or surface 18 is formed entirely, or substantially entirely, of the plurality of projections 16).

The back portion 12 may include a relatively dense concentration of the projections 16 on the inner side 18 thereof to form, in part, a relatively large number of convection cooling pathways 30. The relatively dense concentration of the projections 16 on the inner side 18 of the back portion 12 may also form a relatively large contact area with an electronic device 100 to provide for a relatively large degree of conduction of heat from the electronic device 100 to the back portion 12 of the cooling device 10. For example, the back portion 12 may include a plurality of projections 16 arranged in a density of at least about 40 projections per square inch of the back side or portion 18. In another example, the back portion 12 may include a plurality of projections 16 arranged in a density of at least about 75 projections per square inch of the back side or portion 18. In other embodiments, the back portion 12 may include a plurality of projections 16 arranged in a density within the range of about 40 projections per square inch to about 120 projections per square inch of the back side or portion 18. In some such embodiments, the projections 16 may provide a particularly effective or advantageous balance of convection cooling pathways 30 extending between the projections 16 and conduction surface area in contact with the side or portion 102 of the electronic device 100 with which the cooling device 10 is coupled.

In some embodiments, as shown in FIGS. 1-3, 9 and 12, the projections 16 may be arranged or provided in a repeating pattern or layout on the back portion 12. For example, the projections 16 may be arranged in an evenly spaced grid pattern. In alternative embodiments, the projections 16 may be arranged or provided in a non-repeating pattern or patterns, or may not be provided in a particular pattern or defined layout. The projections 16 should be arranged or laid out, however, to provide or form a plurality of cooling pathways 30 extending between the projection 18 and the cooling channels 22 when the cooling device 10 is coupled with an electronic device 100.

Each projection of the plurality of projections 16 may be of, or define, the substantially same shape, size, height or other configuration or orientation, as shown in FIGS. 1-3. In other embodiments, the projections 16 may include or define differing shapes or configurations. In the illustrated exemplary embodiment, each projection of the plurality of projections 16 is substantially dome or conical shaped. In some such embodiments, the dome or conical shaped projections 16 may be defined by a radius of about 1.3 millimeters. However, in alternative embodiments the projections 16 may be shaped or configured other than dome or conical. The projections 16 are preferably shaped or otherwise configured such that a plurality of convection cooling pathways 30 are formed between the projections 16 and a side or portion 102 of an electronic device 100 that abuts the projections 16, such as between dome or conical shaped projections 16 and a back side 102 of an electronic device 100 abutting the apex or outermost portions of the projections 16. In this way, the projections 16 may form or define any shape or configuration such that the projections 16 form a plurality of convection cooling pathways 30 between the projections 16 themselves (and, potentially, the portions of the inner side 18 that are void of the projections 16) and the outer surface or portion 102 of the electronic device 100 coupled thereto that extend between at least two cooling channels 22 of the side walls 14 to form a thermosiphon effect during use of the electronic device 100. It is appreciated that if the projections 18 are spaced from each other, the projections 18 may not be shaped or configured to narrow or become smaller as they extend away from the inner side 18 of the back portion 12. Similarly, if the projections 16 extend from each other or abut each other, the projections will likely at least partially narrow or become smaller as they extend from the inner side 18 of the back portion 12 or otherwise be configured to form the cooling channels 22 between the projections 16 themselves and the outer abutting or engaged surface 102 of the electronic device 100. Stated differently, as shown in FIG. 13 and further discussed below, the projections 18 are be shaped, spaced and/or otherwise configured to form a plurality of convection cooling pathways 30 that provide for a cooling flow of air during use of an electronic device 100 that is coupled with the cooling device 10. The cooling passageways 30 are formed between the projections 18 themselves and the surface or side 102 of the electronic device 100 abutting the projections 18, and extend between at least a pair of the cooling channels 22 of the side walls 14, to form a thermosiphon effect between the electronic device 100 and the cooling device 10 during use of the electronic device 100. In this way, the projections 18 conduct or "pull" heat away from the electronic device 100 via conduction, and air flowing through the cooling pathways 30 (via the thermosiphon or stack effect) cools both the exposed surfaces or portions 102 of the electronic device 100 and the projections 18 themselves via convection to effectively and/or efficiently cool the electronic device 100.

As shown in FIGS. 1, 3 and 9-13 and discussed above, proximate to the plurality of projections 16 is a plurality of cooling channels 22. The plurality of projections 16 and plurality of cooling channels 22 are configured such that the cooling pathways 30 formed by the projections 16 and the abutting or coupled surface or portion 102 of the electronic device 100 are in communication with the cooling channels 22 (when an electronic device 100 and the cooling device 10 are coupled). Further, as each cooling channel 22 includes a cooling aperture 24 extending through the side walls 14, the plurality of projections 16 and plurality of cooling channels 22 are configured such that the cooling pathways 30 formed by the projections 16 and the electronic device 100 are in communication with the apertures 24 for the intake and outlet of air through the cooling pathways 30 (i.e., convection flow).

As shown in FIGS. 1 and 9-13, the inner surface 26 of the side walls 14 of the cooling device 10 may extend from the inner side or surface 18 of the back portion 12 and be shaped or otherwise configured to abut against an electronic device 100. For example, the inner surface 26 of the exemplary illustrative embodiment is substantially C-shaped or concave such that the side walls 14 abut the sides 104 of a particular electronic device 100, such as a handheld portable electronic device 100. The inner surface 26 of the side walls 14 may thereby at least partially surround a portion 102, 104 of an electronic device 100 when the electronic device 100 and the cooling device 10 are coupled. In this way, the inner surface 26 of the side walls 14 of the cooling device 10 may be shaped and otherwise configured (e.g., flexible) to removably couple or hold a particular electronic device 100 against the back portion 12, such as couple or hold a back portion or side 102 of the electronic device 100 in abutment with the plurality of projections 16.

As noted above, the inner surface 26 of the side walls 14 of the cooling device 10 may extend from the inner side or surface 18 of the back portion 12 and be shaped and otherwise configured to abut against a portion 104 of an electronic device 100. In the illustrated exemplary embodiment, the entirety of the periphery of the back portion 12 includes the side walls 14. In other embodiments, however, only a portion of the periphery of the back portion 12 may include the side walls 14. In some embodiments the inner surface 26 of the side walls 14 may be configured to abut a portion 104 of an electronic device 100, such as the sides 104 thereof, substantially about the periphery of the back portion 12. As shown in FIGS. 9-13, the portion of the inner surface 26 of the side walls 14 that abuts the periphery of the electronic device 100 may be positioned above the channels 22 and be distal to the back portion 12 (at least at or proximate to the channels 22). In this way, the inner surface 26 of the side walls 14 may substantially close off, isolate or seal (e.g., at least partially airtight) the portions 102, 104 of the electronic device 100 proximate to the back portion 12 of the cooling device 10 and the inner side or portion 18 (including the plurality of projection 16), cooling channels 22, and cooling channel apertures 24 of the cooling device 10 (i.e., the cooling passageways 30). The side walls 14 may thereby create or form a chamber or enclosed area defined by the outer surfaces or portions 102, 104 of the coupled electronic device 100 and the back portion 12 and the lower portion of the side walls 16 (with the cooling channels 22 and cooling channel apertures 24) of the cooling device 10 to facilitate the formation of a thermosiphon or stack effect as the outer surfaces or portions 102, 104 of the electronic device 100 increase in temperature above ambient temperature. In some such embodiments, the inner surface 26 of the side walls 14 may be configured to abut a portion of an electronic device 100, such as the sides 104 thereo, substantially about the periphery of the back portion 12 but for the apertures 50 of the device that are configured to allow full function or accessibility of the electronic device 100 while the cooling device 10 is coupled thereto.

Figure 12:
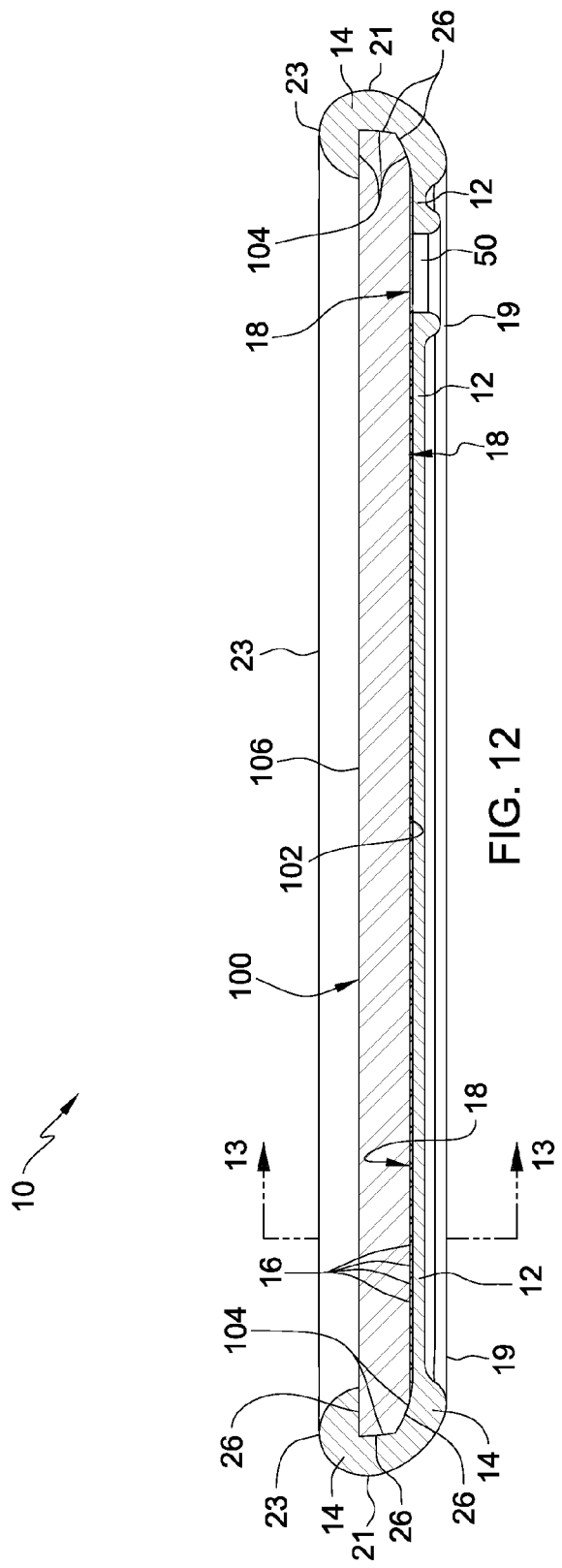
FIG. 12 is a cross-sectional view of the electronic cooling device of FIG. 1 coupled with an exemplary electronic device.

The cooling channels 22 may be recessed portions in the inner surface 26 of the side walls 14, as compared to the other portions of the inner surfaces 26 of the side walls 14, as shown in FIGS. 1, 3 and 9-13. Specifically, the inner surfaces 26 of the side walls 14 may be configured to abut portions (e.g., side portions 104) of an electronic device 100 as shown in FIG. 12, and the cooling channels 22 may be recessed with respect to such inner surfaces 26 as shown in comparison in FIG. 13. In some embodiments, the cooling channels 22 may abut, or extend proximate from, a plurality of projections 16 and extend to corresponding cooling apertures 24, as shown in FIGS. 1, 3 and 11. The cooling channels 22 may increase in depth or thickness as they extend from the projections 16. The cooling channels 22 may extend away from the projections 16 and back portion 18 to the corresponding cooling apertures 24 in both in the horizontal and vertical directions when the back portion 12 of the cooling device 10 is orientated substantially horizontally. In this way, as shown in FIG. 13, the cooling channels 22 may act in concert with the plurality of projection 16 and the outer surfaces 102, 104 of an electronic device 100 coupled with the cooling device 10 to extend the cooling passageways 30 to the cooling apertures 24. Stated differently, the cooling apertures 22 may act in concert with the plurality of projections 16 and an electronic device 100 coupled with the cooling device 10 to form cooling passageways 30 that extend between the plurality of cooling apertures 24 formed through the side walls 14 of the cooling device 10 and along or across a portion or surface 102 of the electronic device 100.

In some embodiments, the cooling device 10 may include a plurality of cooling channels 22 in the inner surface 26 of the side walls 14. In some such embodiments, cooling channels 22 may be provided about the periphery of the back portion 12. In some embodiments, the cooling channels 22 may be specifically located or positioned to effectuate efficient cooling of a particular electronic device 100. For example, the cooling channels 22 may be positioned, located or arranged such that they are proximate to hotter portions of the particular electronic device 100. As another example, the cooling channels 22 may be positioned, located or arranged such that cooling pathways 30 formed by the cooling channels 22 and the plurality of projections 16 (in concert with the electronic device 100) extend at least between a pair of cooling channels 22 and across, through, along or proximate to at least one hotter portion of the particular electronic device 100 (or at least one portion of the electronic device 100 that particularly benefits from being cooled).

To facilitate or ensure the formation of a thermosiphon or stack effect of convection cooling air flow through the cooling passageways 30, each cooling channel 22 may include a respective cooling aperture 24 extending through the side walls 14 from the inner surface 26 to an outer surface 21, as noted above. The cooling aperture 22 of each cooling channel 22 may be positioned distal to the projections 16. For example, the cooling apertures 24 may be positioned in a medial portion of the thickness of the side walls 14. In some embodiments, the cooling apertures 24 may be spaced from the projections 16 on the back portion 12 in both the horizontal (e.g., width or length) and vertical (e.g., thickness) directions when the back portion 12 is orientated substantially horizontally. As discussed above, the cooling channels 22 and cooling apertures 24 may be positioned below (e.g., in the thickness direction) the portion of the side walls 14 that abut the periphery or outer sides or edges 104 of the electronic device 100 and, potentially, seal off the cooling pathways 30 (e.g., seal off the cooling channels 22, projections 16 and the portions 102, 104 of the electronic device 100 proximate to the back portion 18).

As discussed herein, the cooling device 10 may operate via a thermosiphon or stack effect which forms a convection cooling air flow through the cooling passageways 30. For example, before or during use of the cooling device 10, the cooling device 10 may be coupled with an electronic device 100 and at least one portion of the electronic device 100 may be in abutment with or proximate to the back portion 18 of the cooling device 10. In such a configuration or condition, at least one portion of the electronic device 100 may heat up or produce heat, which may be transferred or passed (e.g., conduction) to the air in the cooling pathways 30 and to the back portion 18 (e.g., via conduction through the projections 16 in abutment with the electronic device 100). The heated portion(s) of the back portion 18, such as the projections 16 and any space or portions extending between the projections 16, may further transfer or pass heat to the air in the cooling pathways 30. Stated differently, air in the cooling pathways 30 may be heated by the electronic device 100 and, potentially, the cooling device 10 coupled thereto (e.g., by way of the back portion 18). Once heated, the relatively hot air within the cooling pathways 30 will expand and therefore want or tend to rise in a vertical direction extending substantially opposite to the direction of gravity. The heated air within the cooling pathways 30 will thus be directed by the cooling device 100 and the electronic device 100 such that it travels through the cooling pathways 30 to at least one "outlet" cooling aperture 24 via at least one respective cooling channel 22 positioned above the heated air in the vertical direction and into the ambient environment. To replace the heated air flowing out of the cooling passageways 30 via the at least one outlet cooling aperture 24, relatively cool or ambient air may be drawn into or otherwise flow into the cooling passageways 30 via at least one "intake" cooling aperture 24 positioned below the at least one outlet cooling aperture 24 in the vertical direction. The at least one intake cooling aperture 24, which is in communication with at least one cooling channel 22 and therefore in communication with the cooling passageways 30, may thereby allow relatively cool air (e.g., ambient air) to be drawn, input or fed into the plurality of cooling passageways 30 to replace the warmed air therein that has escaped through the at least one outlet cooling aperture 24. The relatively cool input air may flow through the plurality of the cooling passageways 30 and absorb heat from the electronic device 10 and/or the cooling device 10, thereby becoming "new" warmed air in the cooling passageways 30. The cycle of warmed air flowing through the cooling passageways and out of the device 10 through the at least one outlet cooling aperture 24, and cool or ambient air being drawn into the device 10 through the at least one outlet cooling aperture 24 and into the cooling passageways 30, may thereby form a cooling convection air flow cycle (i.e., thermosiphon or stack effect) through the cooling passageways 30 which continuously cools the electronic device 100. It is noted that the orientation of the cooling device 10, the arrangement of the cooling apertures 24, and the heat profile of the electronic device 100 may dictate, at least in part, the exact flowpath or flow direction(s) of the warmed or heated air through the cooling pathways 30.

For example, to facilitate or ensure the formation of a thermosiphon or stack effect of convection cooling air flow through the cooling passageways 30, the cooling device 10 may be configured with respect to the orientation of a particular electronic device 100. For example, some electronic device 100 embodiments may include a display 106. In some such embodiments, the display 106 may be arranged on a portion of the electronic device 100 that is exposed when the electronic device 100 and the cooling device 10 are coupled, as shown in FIGS. 12 and 13. For example, a back side or portion 102 of the electronic device 100 may abut the plurality of projections 16 on the back side 18 of the cooling device 10, the side walls 14 of the cooling device 10 may abut and at least partially surround the periphery of the sides 104 of the electronic device 100, and the display 106 of the electronic device 100 may be on a front side or portion 104 of the electronic device 100 that opposes the back side or portion thereof such that the display 106 is positioned within the side walls 14 and, thereby, visible to a user.

In some electronic device 100 embodiments that include a display 106, the electronic device 100 may be configured such that the display 106 is configured to be viewed in at least one first orientation of the electronic device 100. To facilitate or ensure the formation of a thermosiphon or stack effect of convection cooling air flow through the cooling passageways 30 of the cooling device 10, the cooling device 10 may be configured or arranged such when the cooling device 10 is coupled to the electronic device 100 and they are oriented in the at least one first orientation, at least one first or outlet cooling aperture 24 is positioned above at least one second or intake cooling aperture 24 in the vertical direction. In this way, when oriented in the at least one first orientation, a thermosiphon or stack effect is created with cooler (e.g., ambient) air being drawn into the cooling passageways 30 via the at least one second or intake cooling aperture 24, flowing through the cooling passageways 30 and absorbing heat from the back portion 18 and the electronic device 100 proximate thereto, and flowing out of the cooling device 10 through the at least one first or outlet cooling aperture 24.

In some other electronic device 100 embodiments that include a display 106, the electronic device 100 may be configured such that the display 106 is configured to be viewed in either at least one first orientation or at least one second orientation of the electronic device 100. To facilitate or ensure the formation of a thermosiphon or stack effect of convection cooling air flow through the cooling passageways 30 of the cooling device 10, the cooling device 10 may be configured or arranged such when the cooling device 10 is coupled to the electronic device 100 and they are oriented in either of the at least one first orientation or the at least one second orientation, at least one first or outlet cooling aperture 24 is positioned above at least one second or intake cooling aperture 24 in the vertical direction. In this way, when oriented in either of the at least one first orientation or the at least one second orientation, a thermosiphon or stack effect is created with cooler (e.g., ambient) air being drawn into the cooling passageways 30 via the at least one second or intake cooling aperture 24, flowing through the cooling passageways 30 and absorbing heat from the back portion 18 and the portion of the electronic device 100 proximate thereto, and flowing out of the cooling device 10 through the at least one first or outlet cooling aperture 24. For example, a cooling device with a rectangular shaped display may be configured to be viewed in either of a portrait or landscape orientation with at least one first or outlet cooling aperture 24 positioned above at least one second or intake cooling aperture 24 in the vertical direction.

It is to be understood that the above description is intended to be illustrative, and not restrictive. Numerous changes and modifications may be made herein by one of ordinary skill in the art without departing from the general spirit and scope of the inventions as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the inventions. Additionally, while various embodiments of the inventions have been described, it is to be understood that aspects of the disclosure may include only some of the described embodiments. Accordingly, the inventions are not to be seen as limited by the foregoing description, but are only limited by the scope of the appended claims.

This written description uses examples to disclose the inventions, including the best mode, and also to enable any person skilled in the art to practice the inventions, including making and using any devices or systems and performing any incorporated methods. The patentable scope of the inventions are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A cooling device for an electronic device, the cooling device comprising:
    a back portion including a first outer surface and a first inner surface, the first inner surface including a plurality of projections for coupling to a back side of the electronic device when the cooling device is coupled to the electronic device; and
    side walls extending about at least a portion of the periphery of the back portion and from the first inner surface thereof including a second outer surface and a second inner surface for coupling to side surfaces of the electronic device when the cooling device is coupled to the electronic device, the side walls including a plurality of cooling apertures extending from the second inner surface to the second outer surface and a recessed cooling channel in the second inner surface extending from each cooling aperture at least to the back portion, and
    wherein when the cooling device is coupled to the electronic device, the plurality of projections, the cooling channels and the back side of the electronic device form a plurality of cooling pathways extending between the plurality of cooling apertures and along at least a portion of the back side of the electronic device.

2. The cooling device of claim 1, wherein a front side of the electronic device includes a display configured to be viewed in a first orientation of the electronic device, and wherein the plurality of cooling apertures include a first cooling aperture positioned above a second cooling aperture in the vertical direction when the cooling device is coupled to the electronic device and the electronic device is oriented in the first orientation.

3. The cooling device of claim 2, wherein the display is configured to be viewed in a second orientation of the electronic device, and wherein the plurality of cooling apertures include a first cooling aperture positioned above a second cooling aperture in the vertical direction when the cooling device is coupled to the electronic device and the electronic device is oriented in either of the first and the second orientations.

4. The cooling device of claim 1, wherein the majority of the first inner surface includes the plurality of projections.

5. The cooling device of claim 1, wherein at least 75 percent of the first inner surface includes the plurality of projections.

6. The cooling device of claim 1, wherein the first inner surface includes within the range of about 40 projections per square inch to about 120 projections per square inch.

7. The cooling device of claim 1, wherein each cooling channel extends on the first inner surface of the back portion proximate to the plurality of projections on the first inner surface.

8. The cooling device of claim 1, wherein the plurality of projections are spaced from each other on the first inner surface, and wherein at least some of the portions of the first inner surface void of the plurality of projections are substantially planar.

9. The cooling device of claim 1, wherein the plurality of projections are dome or conical shaped.

10. The cooling device of claim 9, wherein the projections are each defined by a radius of about 1.3 millimeters.

11. The cooling device of claim 1, wherein the plurality of projections are arranged in an evenly spaced grid pattern.

12. The cooling device of claim 1, wherein the back portion and the side walls are of one-piece construction.

13. The cooling device of claim 1, wherein the back portion and the side walls are formed of food-grade silicone.

14. The cooling device of claim 1, wherein the electronic device is a portable hand-held electronic device.

* * * * *